(12) United States Patent
Hirata

(10) Patent No.: US 8,016,367 B2
(45) Date of Patent: Sep. 13, 2011

(54) APPARATUS AND METHOD FOR CONTROLLING BRAKING-FORCE DISTRIBUTION IN VEHICLE COLLISION

(75) Inventor: Takeshi Hirata, Zama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1170 days.

(21) Appl. No.: 11/724,543

(22) Filed: Mar. 15, 2007

(65) Prior Publication Data

US 2007/0228822 A1 Oct. 4, 2007

(30) Foreign Application Priority Data

Mar. 29, 2006 (JP) ................................. 2006-090027
Jan. 10, 2007 (JP) ................................. 2007-002282

(51) Int. Cl.
*B60L 3/04* (2006.01)
(52) U.S. Cl. .......................... 303/151; 303/138; 303/191
(58) Field of Classification Search .................. 303/138, 303/151, 152, 191
See application file for complete search history.

(56) References Cited

U.S. PATENT DOCUMENTS

| | | | | |
|---|---|---|---|---|
| 5,615,933 | A | * | 4/1997 | Kidston et al. ................. 303/152 |
| 6,364,433 | B1 | * | 4/2002 | Stemer ........................... 303/138 |
| 6,370,461 | B1 | | 4/2002 | Pierce et al. |
| 6,520,044 | B1 | * | 2/2003 | Douglass ......................... 74/512 |
| 7,422,293 | B2 | * | 9/2008 | Chorian et al. ................. 303/20 |
| 2006/0066146 | A1 | * | 3/2006 | Otomo ............................ 303/151 |
| 2009/0192681 | A1 | * | 7/2009 | Hayashi et al. ................. 701/45 |

FOREIGN PATENT DOCUMENTS

| | | |
|---|---|---|
| JP | 61-049601 | 3/1986 |
| JP | 06-153315 | 5/1994 |
| JP | 07-059202 | 3/1995 |
| JP | 10-066248 | 3/1998 |
| JP | 2002-316629 | 10/2002 |
| JP | 2003-256046 A | 9/2003 |
| JP | 2005-094883 | 4/2005 |
| JP | 2005-113760 | 4/2005 |
| JP | 2005-219536 | 8/2005 |
| JP | 2006-014541 | 1/2006 |
| JP | 2006-044654 | 2/2006 |

OTHER PUBLICATIONS

Geng Cong, et al., A Study on Control Strategy for Regenerative Braking in EQ6110 Hybrid Electric Vehicle, Automotive Engineering, 2004 (vol. 26), No. 3, China Academic Journal Electronic Publishing House (Mar. 26, 2004), pp. 253-256.

* cited by examiner

*Primary Examiner* — Bradley T King
(74) *Attorney, Agent, or Firm* — Young Basile

(57) ABSTRACT

An apparatus and method for controlling a braking-force distribution in a vehicle collision is used in a vehicle including at least one electric storage device and at least one motor-generator for driving and braking. When the vehicle decelerates or stops in response to a brake operation, regenerative cooperative brake control is performed in which a braking force of a frictional brake is reduced or eliminated while a braking force of a regenerative brake applied by the motor-generator is increased by an amount corresponding to the reduction in the braking force of the friction brake. When the vehicle collides, the apparatus reduces the braking force of the regenerative brake applied by the motor-generator and increases the braking force of the friction brake.

30 Claims, 8 Drawing Sheets

APPARATUS AND METHOD FOR CONTROLLING BRAKING-FORCE DISTRIBUTION IN VEHICLE COLLISION

CROSS-REFERENCE TO RELATED APPLICATION

This application claims priority from Japanese Patent Application Serial Nos. 2006-090027, filed Mar. 29, 2006 and 2007-002282, filed Jan. 10, 2007, which are incorporated herein in their entirety by reference.

FIELD OF THE INVENTION

The present invention relates to an apparatus for controlling a braking-force distribution in a vehicle collision.

BACKGROUND

Hybrid vehicles, electric vehicles (EV), fuel-cell vehicles (FCV), etc., are known as examples of vehicles including at least one electric storage device, such as a high-voltage battery and a capacitor, and at least one motor-generator for driving.

A vehicle of this type generally includes a regenerative braking apparatus that operates the motor-generator such that the motor-generator generates a driving force while consuming electric power when the vehicle is being driven and generates electric power to regenerate kinetic energy when the vehicle is decelerating.

When the vehicle is decelerating, the regenerative apparatus causes the motor generator to apply a regenerative brake to the vehicle in accordance with a required deceleration. Alternatively, a braking force is generated by both a frictional brake and the regenerative brake applied by the motor-generator in accordance with the brake operation performed by a driver.

In the case in which the frictional brake and the regenerative brake are both applied, regenerative cooperative brake control is performed in which a braking force of the frictional brake is reduced or eliminated while a braking force of the regenerative brake applied by the motor-generator is increased by an amount corresponding to the reduction in the braking force of the friction brake. Thus, the kinetic energy is recaptured by the motor-generator.

In addition, an apparatus for adjusting a driving/braking force by controlling the motor-generator when the tires slip due to a brake operation or an accelerator operation or when an anti-skid braking system (ABS) or a traction control system (TCS) is activated is known.

Further, Japanese Unexamined Patent Application Publications Nos. 7-059202, 10-66248, and 2005-94883, for example, suggest apparatuses for shutting off circuits through which a high-voltage current flows (high-voltage circuits) with relay circuits to prevent short circuits in the event of a vehicle collision or rollover.

SUMMARY OF THE INVENTION

Embodiments of a brake force control apparatus for a vehicle are taught herein. One such apparatus comprises, by example, a battery, a motor-generator that performs regenerative braking with a regenerative braking force and charges the battery with electric power regenerated, a frictional braking device that performs frictional braking with a frictional braking force, a collision detecting/predicting device operable to detect or predict a collision against an obstacle and a controller. The controller is configured to set a braking force distribution such that a sum of the regenerative braking force and the frictional braking force becomes equal to a required braking force according to an operator braking action and change the braking force distribution by reducing the regenerative braking force and increasing the frictional braking force when the collision detecting/predicting device detects or predicts the collision.

Brake force control methods are also taught herein. One brake force control method for a vehicle includes, for example, setting a braking force distribution such that a sum of a regenerative braking force performed by a motor-generator and a frictional braking force performed by a frictional braking device becomes equal to a required braking force according to an operator braking action, detecting or predicting a collision against an obstacle and changing the braking force distribution by reducing the regenerative braking force and increasing the frictional braking force when the collision is detected or predicted.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
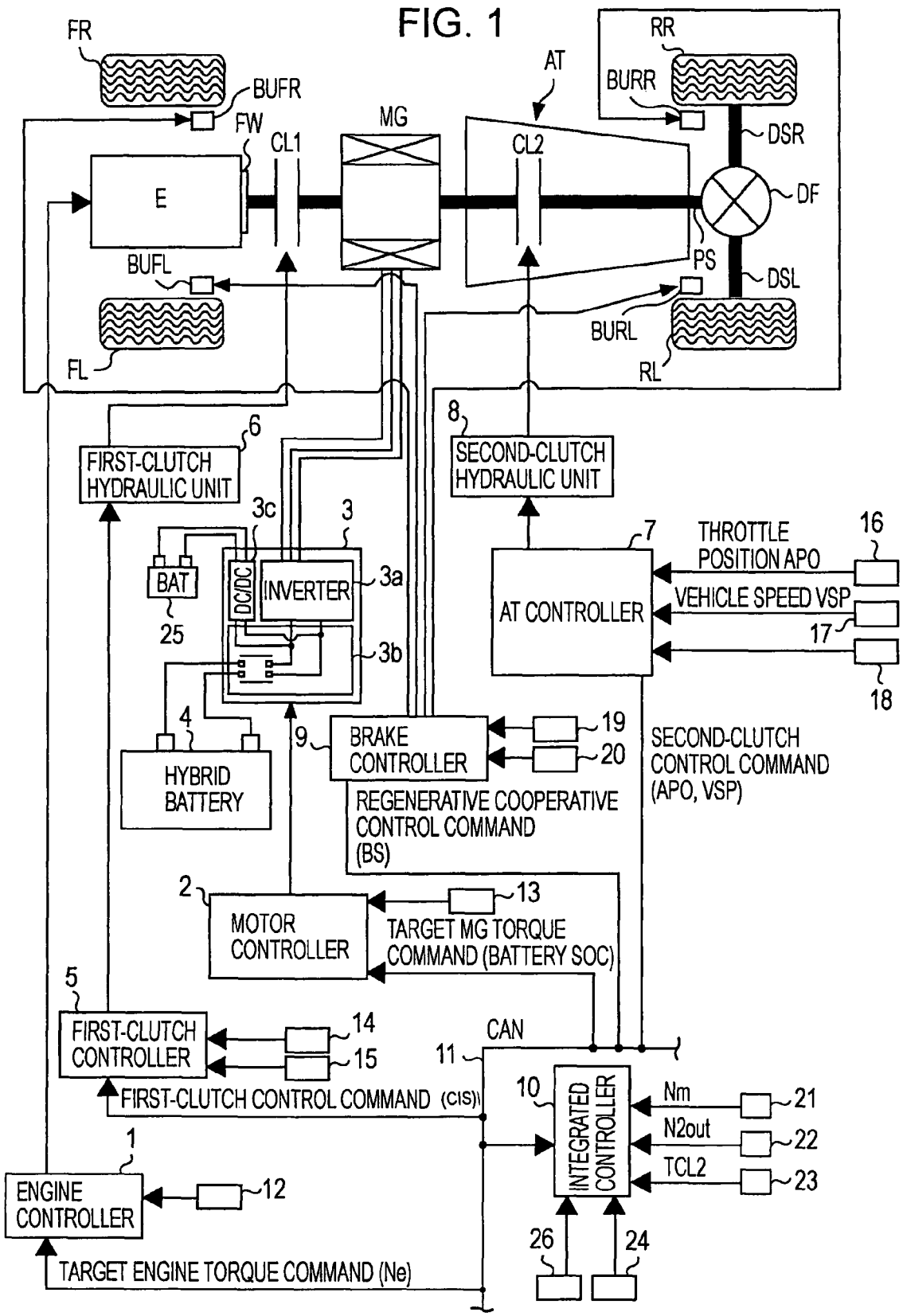
FIG. 1 is a system diagram illustrating a rear-wheel-drive hybrid vehicle including a braking-force-distribution control apparatus according to a first embodiment of the invention.

In known apparatuses such as those described in Japanese Unexamined Patent Application Publications Nos. 7-059202, 10-66248, and 2005-94883, that shut off a high-voltage circuit in the event of a vehicle collision or rollover, there are certain problems.

First, when the high-voltage circuit is shut off a braking distance is increased since regenerative braking control cannot be performed by the motor generator.

Second, if the high-voltage circuit is shut off while the motor-generator is being operated, a torque generated by the motor-generator is suddenly changed, which causes a change in the braking force.

Third, if the high-voltage circuit is shut off with a relay while the current is flowing, the relay will break due to seizing. In addition, there is a risk that the high-voltage circuit cannot be shut off due to seizing of the relay.

In contrast, embodiments of the invention taught herein provide an apparatus and method for controlling a braking-force distribution in a vehicle collision that can prevent an increase in a braking distance and a sudden change in a torque generated by a motor-generator and that can shut off a high-voltage circuit using a relay that does not break due to seizing when a vehicle collides.

Such embodiments are used in a vehicle including at least one electric storage device and at least one motor-generator for driving and braking. When the vehicle decelerates or stops in response to a brake operation, regenerative cooperative brake control is performed in which a braking force of a frictional brake is reduced or eliminated while a braking force of a regenerative brake applied by the motor-generator is increased by an amount corresponding to the reduction in the braking force of the friction brake. When the vehicle collides, the braking force of the regenerative brake applied by the motor-generator is reduced, and the braking force applied by the friction brake is increased.

When the vehicle decelerates or stops in response to a brake operation, the regenerative cooperative brake control is performed in which the braking force of the frictional brake is reduced or eliminated while the braking force of the regenerative brake applied by the motor-generator is increased by an amount corresponding to the reduction in the braking force of the friction brake. However, if the vehicle collides in spite of the brake being applied, the braking-force distribution between the regenerative brake and the frictional brake changes such that the braking force of the regenerative brake applied by the motor-generator is reduced and the braking force of the frictional brake is increased.

When the high-voltage circuit is shut off in the event of a vehicle collision, a braking distance and an amount of reduction in the total braking force are increased as the braking force of the regenerative brake is decreased. According to certain embodiments of the invention, however, the braking force of the regenerative brake is reduced and that of the frictional brake is increased when the vehicle collides. When the high-voltage circuit is shut off, the amount of reduction in the total braking force is equal to the amount of reduction in the braking force of the regenerative brake, or is zero when the braking force of the regenerative brake is already reduced to zero. Therefore, the influence on the braking force control can be reduced, and the braking distance can be prevented from being increased.

In addition, when the high-voltage circuit is shut off in the event of a vehicle collision, a change in the braking torque generated by the motor-generator is increased as the braking force of the regenerative brake is increased. According to embodiments taught herein, the braking force of the regenerative brake is reduced and that of the frictional brake is increased when the vehicle collides. Therefore, when the high-voltage circuit is shut off, a change in the braking torque generated by the motor-generator MG from reducing the braking torque to zero is small, or is zero if the braking force of the regenerative brake is already reduced to zero. Thus, a sudden change in the braking torque generated by the motor-generator is prevented. Accordingly, a shock in the driving/braking force does not occur and the vehicle's motion can be prevented from becoming unstable.

When the high-voltage circuit is shut off in the event of a vehicle collision, the current that flows through the high-voltage circuit is increased as the braking force of the regenerative brake is increased. In embodiments of the invention, the braking force of the regenerative brake is reduced and that of the frictional brake is increased when the vehicle collides. Therefore, the current that flows through the high-voltage circuit can be reduced by the amount corresponding to the reduction in the braking force of the regenerative brake.

Accordingly, even when the high-voltage circuit is shut off in the event of a vehicle collision, the relay is prevented from breaking due to seizing, and the risk that the high-voltage circuit cannot be shut off due to seizing of the relay can be reliably eliminated.

In summary, according to embodiments of the invention, when the vehicle collides, an increase in the braking distance and a sudden change in the torque generated by the motor-generator can be prevented, and the high-voltage circuit can be shut off by a relay that does not break due to seizing.

A braking-force-distribution control apparatus and method for controlling a braking-force distribution in a vehicle collision according to certain embodiments of the invention is next described below in detail with reference to the accompanying drawings.

First, the structure of a driving system of a hybrid vehicle is described.

FIG. 1 is a system diagram illustrating a rear-wheel-drive hybrid vehicle including the braking-force-distribution control apparatus according to a first embodiment of the invention.

As shown in FIG. 1, the drive system of the hybrid vehicle in this first embodiment includes an engine E, a flywheel FW, a first clutch CL1, a motor-generator MG, a second clutch CL2, an automatic transmission AT, a propeller shaft PS, a differential DF, a left drive shaft DSL, a right drive shaft DSR, a left rear wheel RL (driving wheel) and a right rear wheel RR (driving wheel). In addition, the vehicle has a left front wheel FL and a right front wheel FR. The wheels are provided with a left-rear-wheel brake unit BURL, a right-rear-wheel brake unit BURR, a left-front-wheel brake unit BUFL and a right-front-wheel brake unit BUFR. These brake units are frictional brake devices.

The engine E can be, for example, a gasoline engine or a diesel engine, and a throttle valve position or the like is controlled on the basis of control commands output by an engine controller 1, which is described below. The flywheel FW is provided on an output shaft of the engine E.

The first clutch CL1 is interposed between the engine E and the motor-generator MG. The first clutch CL1 is switched between an engaged state and a disengaged state including a slip-engaged state and a slip-disengaged state, respectively. This switching is responsive to an oil pressure generated by a first-clutch hydraulic unit 6 on the basis of a control command output by a first-clutch controller 5, which is described hereinafter.

The motor-generator MG is a synchronous motor-generator including a rotor in which a permanent magnet is embedded and a stator around which a stator coil is wound. The motor-generator MG is controlled by applying a three-phase alternating current generated by an inverter 3a included in a power control unit 3 on the basis of a control command output by a motor controller 2, which is also described hereinafter.

The motor-generator MG is capable of operating as an electric motor that rotates in response to electric power supplied from a hybrid battery 4 (i.e., an electric storage device). This operation is hereinafter called "power running". In addition, the motor-generator MG is also capable of operating as a generator that generates an electromotive force at both ends of the stator coil to charge the hybrid battery 4 when the rotor is being rotated by an external force. This operation is hereinafter called "regeneration".

The rotor of the motor-generator MG is connected to an input shaft of the automatic transmission AT with a damper (not shown) provided therebetween.

The power control unit 3 includes the following three components.

First, the inverter 3a includes semiconductor switching elements (e.g., insulated gate bipolar transistors (IGBT)) for converting a direct current from the hybrid battery 4 into a three-phase alternating current for driving the motor-generator MG and a three-phase alternating current from the motor-generator MG into a direct current to be input to the hybrid battery 4.

Second, a DC/DC converter 3c reduces a voltage from the hybrid battery 4 and supplies electric power to a battery 25. The battery 25 is a power supply for illumination, display, auxiliary devices, etc.

Third, a high-voltage circuit 3b is connected to the hybrid battery 4, the inverter 3a and the DC/DC converter 3c. The high-voltage circuit 3b contains a relay capable of shutting off the electric current to and from the high-voltage circuit 3b. As described below, when a collision of the vehicle occurs, the hybrid battery 4 and the motor-generator MG are shut off from each other by the relay included in the high-voltage circuit 3b.

The second clutch CL2 is interposed between the motor-generator MG and the rear wheels RL and RR. The second clutch CL2 is switched between an engaged state and a disengaged state including a slip-engaged state and a slip-disengaged state, respectively. The switching occurs using an oil pressure generated by a second-clutch hydraulic unit 8 on the basis of a control command output by an AT controller 7, which is described hereinafter.

The automatic transmission AT automatically switches a gear ratio among multiple gears, for example, five forward gears and one reverse gear, in accordance with a vehicle speed and a throttle position. The second clutch CL2 is not provided as a dedicated clutch but uses some of frictional engagement elements engaged at each shift position of the automatic transmission AT. An output shaft of the automatic transmission AT is connected respectively to the left and right rear wheels RL and RR with the propeller shaft PS and the differential DF, with left and right drive shafts DSL and DSR disposed therebetween.

Each of the first clutch CL1 and the second clutch CL2 may be, for example, a multiple-disc wet clutch that can continuously control an oil flow rate and an oil pressure with a proportional solenoid.

The hybrid drive system has two driving modes that are set in accordance with the engaged/disengaged state of the first clutch CL1. When the first clutch CL1 is disengaged, an electric drive mode (hereinafter called an "EV mode"), i.e., a motor drive mode, is set in which only the power of the motor-generator MG is used as a power source for driving the vehicle. When the first clutch CL1 is engaged, a hybrid drive mode (hereinafter called an "HEV mode") is set in which the engine E is additionally used as a power source for driving the vehicle.

The HEV mode includes an engine drive mode, a motor assist mode and a power-generating mode. In the engine drive mode, only the engine E is used as the power source for rotating the driving wheels RR and RL. In the motor-assist mode, the engine E and the motor-generator MG are both used as the power source for rotating the driving wheels RR and RL. In the power-generating mode, the engine E is used as the power source for rotating the driving wheels RR and RL, and the motor-generator MG is controlled to operate as a generator at the same time.

When the vehicle runs at a constant speed or is accelerated, the motor-generator MG is controlled to operate as a generator using the power of the engine E. When the vehicle is decelerated, the motor-generator MG generates electric power by regenerating the braking energy, and thereby generates a regenerative braking force. The generated electric power is thus charged into the hybrid battery 4.

A control system of the hybrid vehicle is next described.

As shown in FIG. 1, the control system of the hybrid vehicle according to the first embodiment includes an engine controller 1, the motor controller 2, the power control unit 3, the hybrid battery 4, the first-clutch controller 5, the first-clutch hydraulic unit 6, the AT controller 7, the second-clutch hydraulic unit 8, a brake controller 9 and an integrated controller 10. The engine controller 1, the motor controller 2, the first-clutch controller 5, the AT controller 7, the brake controller 9 and the integrated controller 10 are connected to each other via control area network (CAN) lines through which information can be communicated. Each controller generally consists of a microcomputer including central processing unit (CPU), input and output ports (I/O), random access memory (RAM), keep alive memory (KAM), a common data bus and read only memory (ROM) as an electronic storage medium for executable programs and certain stored values as discussed hereinafter. The various parts of the integrated controller 10 described herein with respect to the figures could be, for example, implemented in software as the executable programs, or could be implemented in whole or in part by separate hardware in the form of one or more integrated circuits (IC).

The engine controller 1 receives engine speed information from an engine speed sensor 12 and outputs a command for controlling an engine operating point (an engine speed Ne and an engine torque Te) to, for example, a throttle valve actuator (not shown) on the basis of a target engine torque command or the like from the integrated controller 10. The information of the engine speed Ne is supplied to the integrated controller 10 via the CAN lines 11.

The motor controller 2 receives information from a resolver 13 for detecting a rotational position of the rotor included in the motor-generator MG. The motor controller 2 then outputs a command for controlling a motor operating point (a motor-generator speed Nm and a motor-generator torque Tm) based on a target motor-generator torque command and the like obtained from the integrated controller 10. In addition, the motor controller 2 monitors the state of charge (SOC) of the hybrid battery 4. The information regarding the SOC of the hybrid battery 4 is used for controlling the motor-generator MG and is supplied to the integrated controller 10 via the CAN lines 11.

The first-clutch controller 5 receives sensor information from a first-clutch oil-pressure sensor 14 and a first-clutch stroke sensor 15 and outputs a command for controlling the engaged/disengaged state of the first clutch CL1 to the first-clutch hydraulic unit 6 in accordance with a first-clutch control command from the integrated controller 10. The information regarding a first clutch stroke C1S is supplied to the integrated controller 10 via the CAN lines 11.

The AT controller 7 receives sensor information from a throttle position sensor 16, a vehicle speed sensor 17 and a second-clutch oil-pressure sensor 18. The output of the AT controller 7 is a command for controlling the engaged/disengaged state of the second clutch CL2 sent to the second-clutch hydraulic unit 8 in an AT oil-pressure control valve in accordance with a second-clutch control command from the integrated controller 10. The information regarding a throttle position APO and a vehicle speed VSP is supplied to the integrated controller 10 via the CAN lines 11.

The brake controller 9 receives sensor information from a wheel speed sensor 19 that detects a rotational speed of each of the four wheels and a brake stroke sensor 20 that detects a brake stroke BS. When for example a brake pedal is stepped on, a required braking force is determined based on the brake stroke BS. If the required braking force cannot be provided only by the regenerative braking force generated by the motor-generator MG, a frictional braking force is generated to compensate for the deficiency. More specifically, the brake controller 9 controls the braking forces applied by the brake units BURL, BURR, BUFL and BUFR of the respective wheels on the basis of a regenerative cooperative brake control command from the integrated controller 10. In addition, the brake controller 9 operates as a so-called anti-skid braking system. As the anti-skid braking system, the brake controller 9 detects brake locking based on the rotational speed of each of the four wheels, and controls the braking force so as to suppress the brake locking when a brake is applied on a low-$\mu$ road or when a brake is suddenly applied.

The integrated controller 10 has a function of managing the total energy consumption of the vehicle and driving the vehicle at a highest efficiency. The integrated controller 10 receives information from a motor speed sensor 21 that detects a motor speed Nm, a second-clutch output rotational speed sensor 22 that detects a second-clutch output rotational speed N2out, a second-clutch torque sensor 23 that detects a second-clutch torque TCL2 and a brake-oil-pressure sensor 24 and information obtained via the CAN lines 11. In addition, the integrated controller 10 also receives a collision impact signal from a collision impact sensor 26, such as an airbag sensor, which is described hereinafter.

The integrated controller 10 controls the operation of the engine E by outputting the control command to the engine controller 1, the operation of the motor-generator MG by outputting the control command to the motor controller 2, the engaged/disengaged state of first clutch CL1 by outputting the control command to the first-clutch controller 5 and the engaged/disengaged state of the second clutch CL2 by outputting the control command to the AT controller 7.

Collision impact sensor 26 is, for example, an airbag sensor that includes an acceleration sensor attached to the vehicle body. When a large acceleration is applied to the vehicle body, the airbag sensor outputs a collision impact signal that corresponds to the degree of acceleration to activate an airbag for protecting an occupant. A plurality of acceleration sensors may be provided for detecting accelerations in the front-rear direction, the right-left direction, etc., of the vehicle. In such a case, the direction of impact can be detected.

Figure 2:
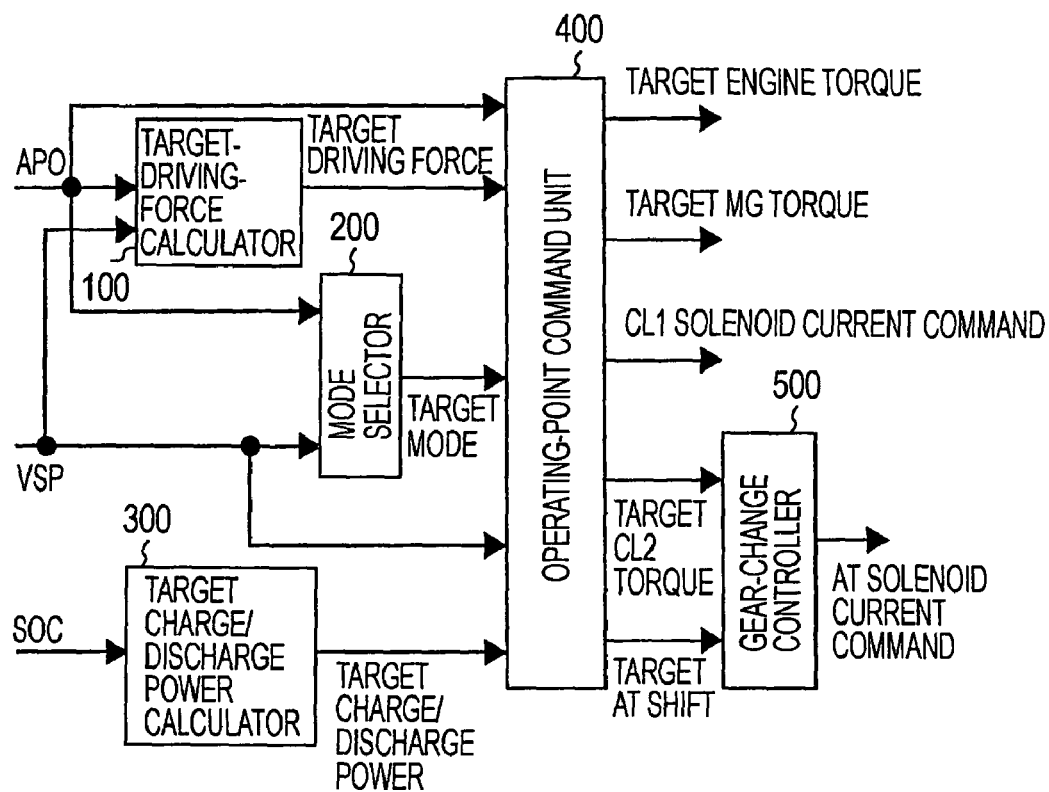
FIG. 2 is a control block diagram illustrating a calculation processing system of an integrated controller according to the first embodiment.

A control operation executed by the integrated controller 10 according to the first embodiment is next described with reference to a block diagram shown in FIG. 2. The operation described may be repeatedly executed with a control period of, for example, 10 msec.

The integrated controller 10 includes a target-driving-force calculator 100, a mode selector 200, a target charge/discharge power calculator 300, an operating-point command unit 400 and a gear-change controller 500.

Figure 3:
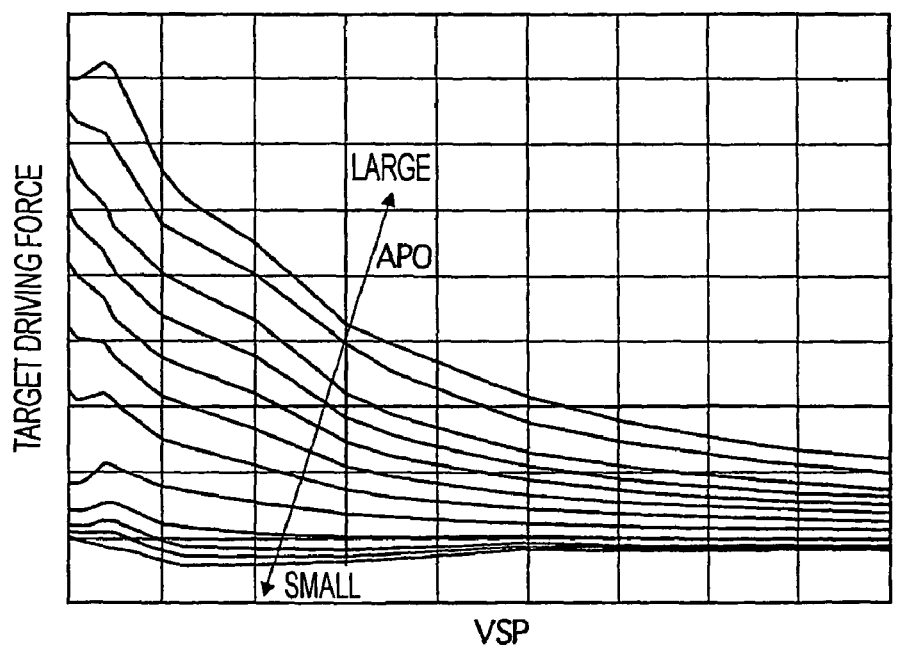
FIG. 3 illustrates an example of a target-driving-force map used by a target-driving-force calculator shown in FIG. 2 for calculating a target driving force.

The target-driving-force calculator 100 calculates a target driving force tFoO based on the throttle position APO and the vehicle speed VSP by referring to a target-driving-force map such as that shown in FIG. 3.

Figure 4:
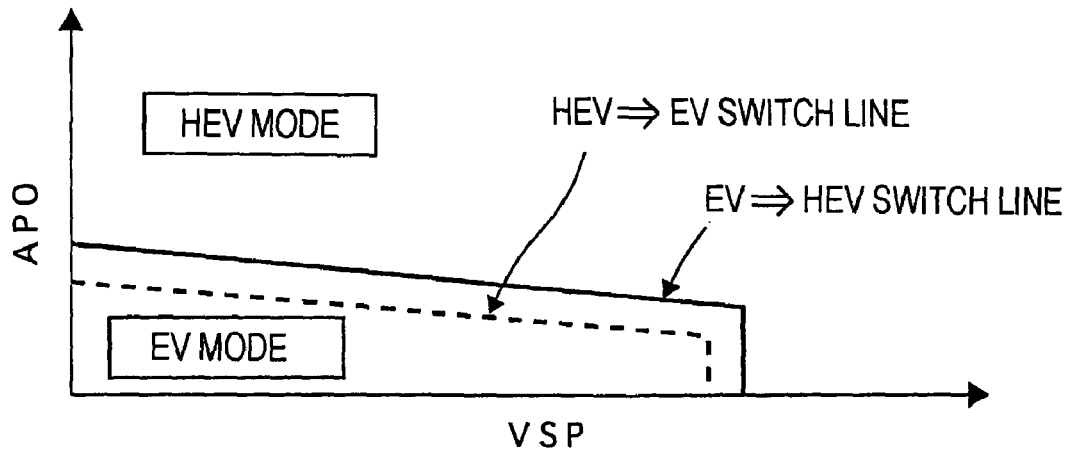
FIG. 4 illustrates an example of a target-mode map used by a mode selector shown in FIG. 2 for selecting a target mode.

The mode selector 200 determines which of the EV mode and the HEV mode is to be set as a target mode based on the throttle position APO and the vehicle speed VSP by referring to an EV-HEV selection map such as that shown in FIG. 4. However, if the SOC of the hybrid battery 4 is equal to or less than a predetermined value, the HEV mode is automatically selected as the target mode.

Figure 5:
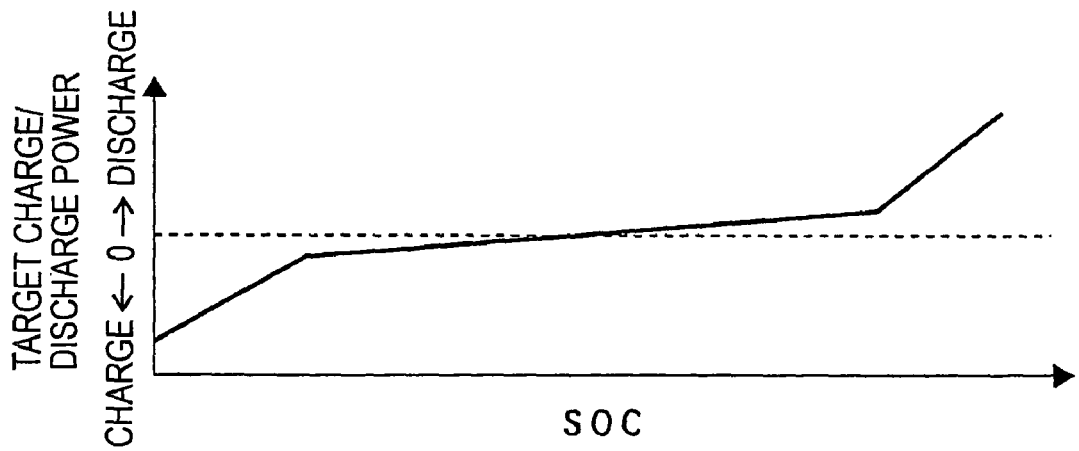
FIG. 5 illustrates an example of a target charge/discharge power map used by a target charge/discharge calculator shown in FIG. 2 for calculating target charge/discharge power.

The target charge/discharge power calculator 300 calculates a target charge/discharge power tP based on the SOC of the hybrid battery 4 by referring to a target charge/discharge power map such as that shown in FIG. 5. As is clear from FIG. 5, the hybrid battery 4 is discharged when the SOC thereof is high and is charged when the SOC thereof is low.

The operating-point command unit 400 calculates a transient target engine torque, a target motor-generator torque, a target second-clutch torque capacity, a target shift position of the automatic transmission AT and a first-clutch solenoid current command as operating-point target values based on the throttle position APO, the target driving force tFoO, the target mode, the vehicle speed VSP and the target charge/discharge power tP.

The gear-change controller 500 drives and controls a solenoid valve included in the automatic transmission AT so as to achieve the target second-clutch torque capacity and the target shift position.

Figure 6:
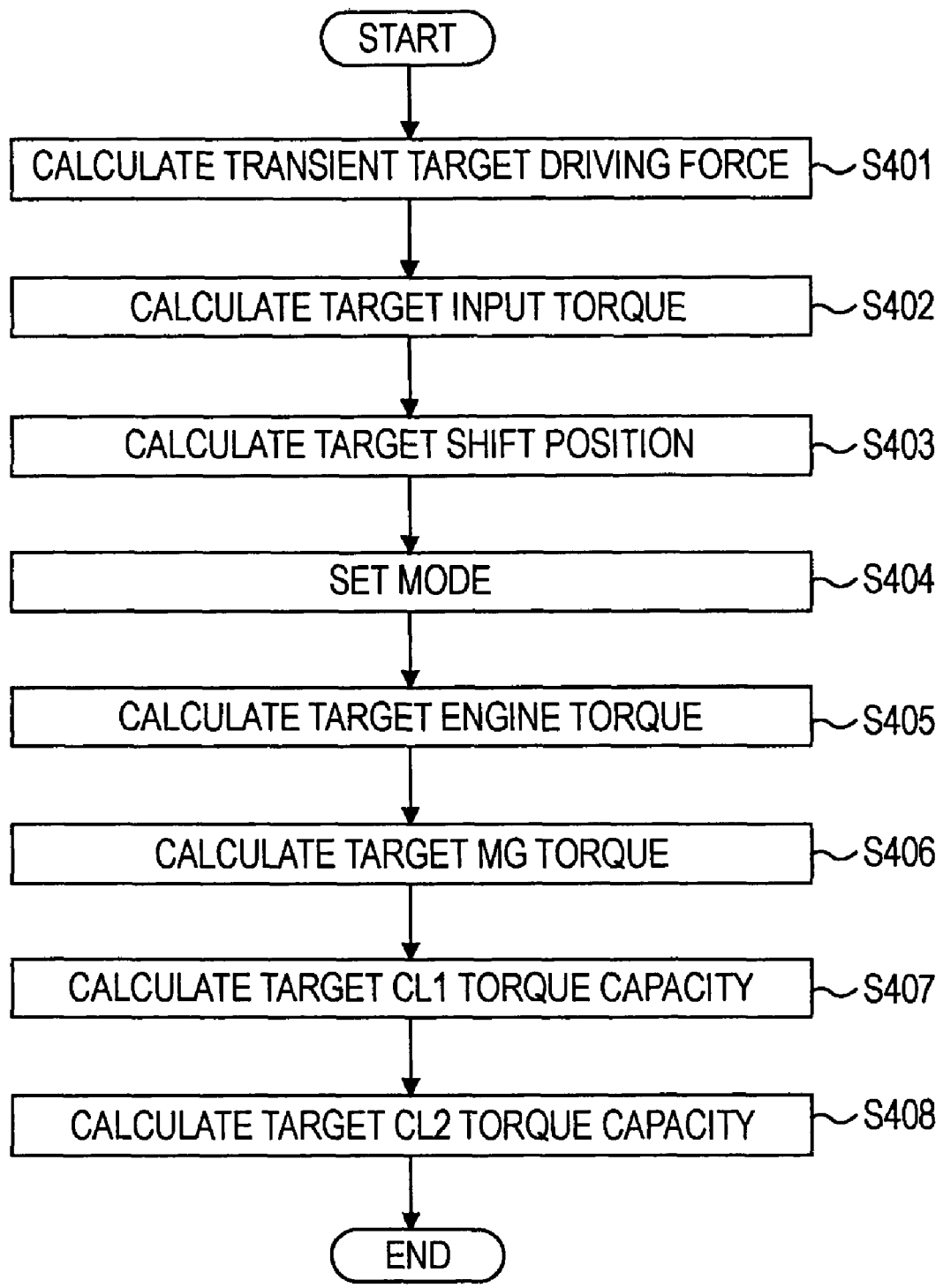
FIG. 6 is a flowchart of a calculation process carried out by an operating-point command unit shown in FIG. 2 for determining an operating point.

FIG. 6 is a flowchart of a process of calculating operating-point commands performed by the operating-point command unit 400 included in the integrated controller 10.

In step (hereinafter "S") 401 a transient target driving force tFo is obtained by performing a predetermined transient response process for the target driving force tFoO. Then, the process proceeds to S402.

As one example, an output of a low-pass filter with a predetermined time constant obtained when the target driving force tFoO is input is the transient target driving force tFo.

In S402, after the transient target driving force is calculated in S401, a target input torque tTin of the automatic transmission AT is calculated as follows:

$$tTin = tFo \times rt/if/iG; \text{ wherein} \tag{1}$$

rt is a tire diameter;
if is a final gear ratio; and
iG is a gear ratio at the current shift position. Then, the process proceeds to S403.

Figure 7:
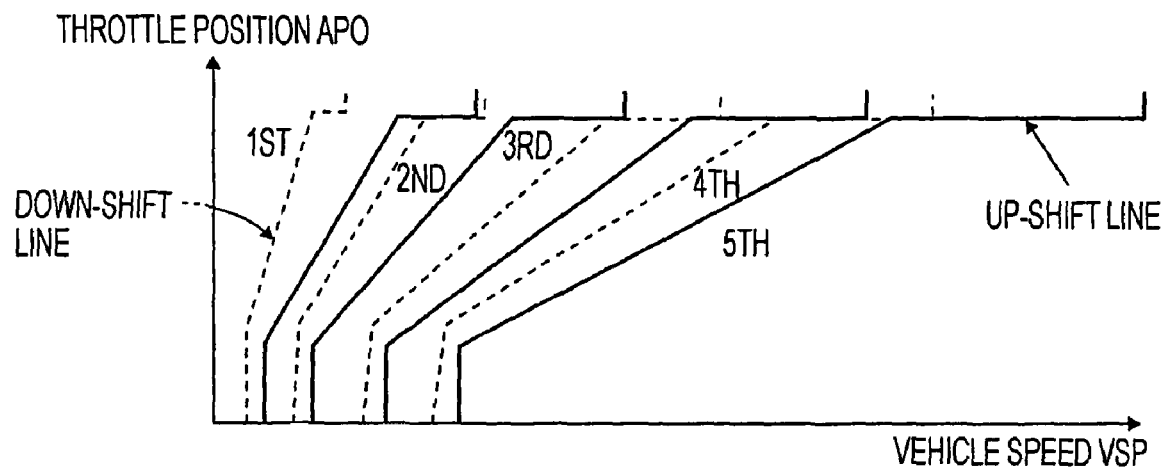
FIG. 7 illustrates an example of a shift map used in a step of calculating a target shift position in the calculation process shown in FIG. 6.

In S403 the target shift position is calculated based on the throttle position APO and the vehicle speed VSP by referring to a shift map such as that shown in FIG. 7. In FIG. 7, the solid line shows an up-shift line and the dashed line shows a down-shift line.

After the target shift position is calculated in S403, the process advances to S404 wherein mode setting is performed in accordance with the target mode. In a steady state, the EV mode or the HEV mode is set as the target mode. However, when a driving point crosses the HEV⇒EV switch line in the EV-HEV selection map shown in FIG. 4, mode-switch control for switching from the HEV mode to the EV mode is performed. Similarly, when the driving point crosses the EV⇒HEV switch line in the HEV-EV selection map shown in FIG. 4, mode-switch control for switching from the EV mode to the HEV mode is performed.

Next, in S405 after the mode is set in S404, a target engine torque tTe is determined. More specifically, when the HEV mode is set, an ideal engine torque tTeO is first calculated based on the target input torque tTin, an input rotational speed Nin of the automatic transmission AT and the engine speed Ne as follows:

$$tTeO=(tTin \times Nin-tP)/Ne. \quad (2)$$

Figure 8:
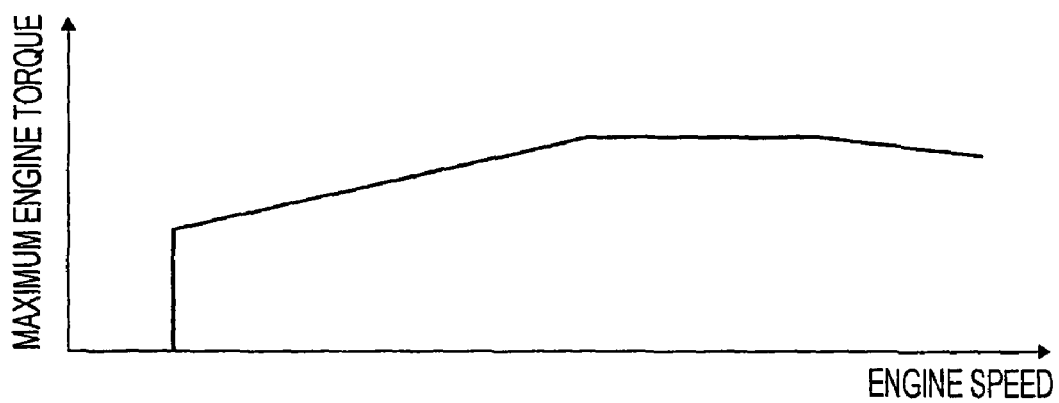
FIG. 8 illustrates an example of a map of maximum engine torque versus engine speed that is used in a step of calculating a target engine torque in the calculation process shown in FIG. 6.

Then, the target engine torque tTe is determined by limiting the ideal engine torque tTeO with a maximum engine torque corresponding to the engine speed Ne by referring to a maximum-engine-torque map such as that shown in FIG. 8. When the EV mode is set the target engine torque tTe is set to zero.

After the target engine torque is calculated in S405, in S406 a target motor-generator torque tTm is calculated by the following equation if the EV mode or the HEV mode is selected:

$$tTm=tTin-tTe. \quad (3)$$

If the mode is being switched, the target motor-generator torque is determined by an operation performed during mode switching, which is described below.

A target first-clutch torque capacity is set in S407 after the target motor-generator torque is calculated in S406. The target first-clutch torque capacity is set to zero if the EV mode is set and to a maximum value if the HEV mode is set. If the mode is being switched, the target first-clutch torque capacity is determined by the operation performed during mode switching described below.

In S408, after the target first-clutch torque capacity is calculated in S407, a target second-clutch torque capacity tcTcl2 is determined. The target second-clutch torque capacity tcTcl2 is set to a value evTmax that corresponds to a maximum driving force in the EV mode if the EV mode is set, and is set to a maximum value if the HEV mode is set. If the mode is being switched, the target second-clutch torque capacity tcTcl2 is determined by the operation performed during mode switching described below. The process ends upon completion of S408.

Figure 9:
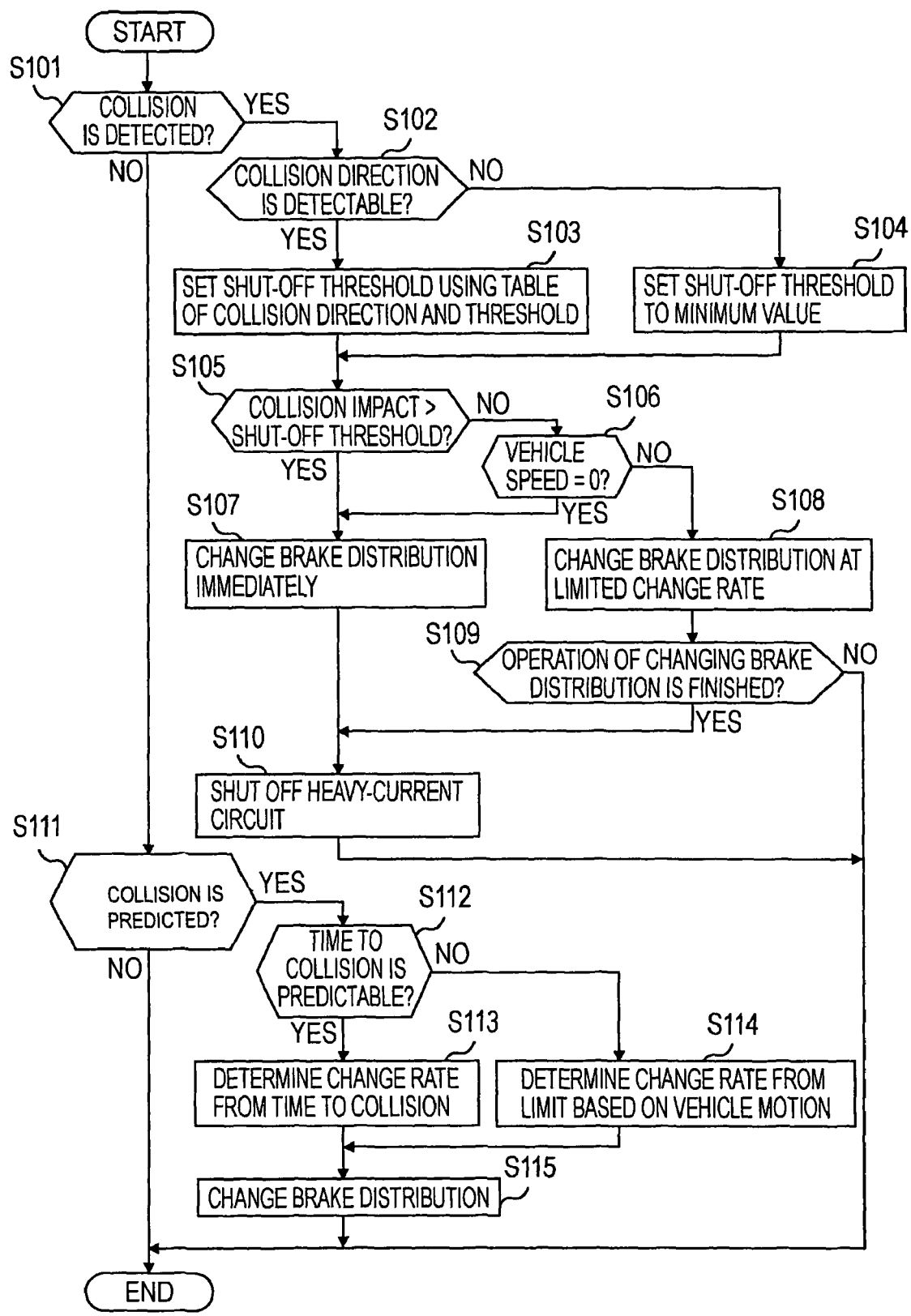
FIG. 9 is a flowchart of a process carried out by the integrated controller according to the first embodiment for controlling a braking-force distribution in a vehicle collision.

FIG. 9 is a flowchart of an example braking-force-distribution control process performed by the integrated controller 10 for controlling a braking-force distribution in the event of a vehicle collision. This process is repeatedly executed with a control period of, for example, 10 msec.

In S101, it is determined whether or not a collision is detected based on a signal from the collision impact signal from an airbag sensor, which functions as a collision detector, or collision impact sensor, 26. If the response to this query is No, the process proceeds to S111. If the response is Yes, the process proceeds to S102. Thus, in this braking-force-distribution control process, the operation of controlling the braking-force distribution between the regenerative brake and the frictional brake is started when a collision of the vehicle is detected based on the signal from the airbag sensor.

In place of the airbag sensor, other devices may also be used as the collision detector 26.

One such alternative device for the collision detector 26 is a device that detects a collision of the vehicle using an acceleration sensor included in a vehicle motion control system or a traction control system. The vehicle motion control system is a system used for avoiding an obstacle while braking the vehicle by individually controlling a braking force applied to each wheel to generate a yaw moment. The traction control system is a system used for suppressing drive slip by controlling the driving/braking force when the drive slip occurs.

Another alternative is a device that detects a collision of the vehicle using a crash sensor as the collision detector 26. The crash sensor may be a sensor that detects a collision based on a change in the longitudinal force applied to the vehicle or a sensor that detects a collision based on a change in an electrostatic capacitance.

In S102, after a collision is detected in S101, it is determined whether or not a collision direction is detectable. If the response is Yes, that is, the collision direction is detectable, the process proceeds to S103 where a power shut-off threshold is set. The power shut-off threshold, which is a threshold for a collision impact value, is set by referring to a table showing the relationship between the collision direction and the power shut-off threshold. As described in detail below, the power shut-off threshold is used for determining, based on the collision impact value, whether or not it is necessary to change the braking-force distribution between the regenerative brake and the frictional brake and shut off the high-voltage circuit immediately when a collision occurs.

In the braking-force-distribution control process according to the first embodiment, the power shut-off threshold for the collision impact value is set to different values depending on the collision direction. More specifically, in the table showing the relationship between the collision direction and the power shut-off threshold, the power shut-off threshold for the collision impact value is set to a small value when the collision direction is a direction in which a high-voltage element, an electric storage element or an element using fuel is disposed.

In contrast, if it is determined that the collision direction is not detectable at S102, processing advances to S104, where the power shut-off threshold is set to a minimum value in consideration of the possibility that the collision direction may be the direction in which the high-voltage element, the electric storage element or the element using fuel is disposed.

Whether the power shut-off threshold is set in S103 or S104, the process proceeds to S105. In S105 it is determined whether or not the collision impact value is higher than the power shut-off threshold. If the result of this query is Yes, the process proceeds to S107. Otherwise, the process proceeds to S106.

In the braking-force-distribution control process according to the first embodiment, when a collision of the vehicle is detected, the braking-force distribution between the regenerative brake and the frictional brake is determined on the basis of the level of impact.

After it is determined that the collision impact value is equal to or lower than the power shut-off threshold in S105, in S106 it is determined whether or not the vehicle speed is equal to zero. If the vehicle speed is equal to zero, the process proceeds to S107. If the vehicle speed is not equal to zero, the process proceeds to S108.

As stated above, the process proceeds to S107 if the collision impact value is higher than the power shut-off threshold in S105 or if the collision impact value is equal to or lower than the power shut-off threshold but the vehicle speed is zero in response to the queries of S105 and S106. In S107 the braking-force distribution between the regenerative brake and the frictional brake is immediately changed. Then, the process proceeds to S110.

Thus, in the braking-force-distribution control process according to the first embodiment, the braking-force distribution between the regenerative brake and the frictional brake is changed immediately if it is determined that the collision impact value is higher than the power shut-off threshold.

In addition, the braking-force distribution between the regenerative brake and the frictional brake is also changed immediately if the collision impact value is equal to or lower than the power shut-off threshold but the vehicle is stopped.

In contrast, after it is determined that the vehicle speed is more than zero in S106, the braking-force distribution is changed at a rate within a change-rate limit in S108. Then, the process proceeds to S109.

Thus, in the braking-force-distribution control process according to the first embodiment, if the collision impact value is lower than the power shut-off threshold, the braking-force distribution between the regenerative brake and the frictional brake is changed at such a rate that the vehicle's motion does not suddenly change.

In S109, after the operation of changing the braking-force distribution at a rate within the change-rate limit is started in S108, it is determined whether or not this operation is finished. If the result of this query shows that the operation of changing the brake distribution is finished, the process proceeds to S110. If the result is instead that the operation is not finished, the process ends.

After the braking-force distribution is changed immediately in S107 or after the operation of changing the braking-force distribution is finished in S109, the high-voltage relay provided in the high-voltage circuit 3b is shut off in S110 and processing ends.

In S111, after no collision is detected in S101, it is determined whether or not a collision is predicted based on whether or not the anti-skid braking system, which functions as a collision predictor, is activated. If a collision is not predicted in S111, the process ends. If a collision is predicted in S111, the process proceeds to S112. Thus, in the braking-force-distribution control process according to the first embodiment, an operation of controlling the braking-force distribution between the regenerative brake and the frictional brake can also be started when the anti-skid braking system (collision predictor) is activated, and a collision of the vehicle is predicted accordingly.

In place of or in addition to the anti-skid braking system, other devices may also be used as the collision predictor.

For example, a device that predicts a collision of the vehicle when an intelligent brake assist is activated may also be used as the collision predictor. The intelligent brake assist includes a sensor for detecting a distance to a vehicle running in front and issues a warning for prompting the driver to perform an emergency operation. If the collision cannot be avoided by the emergency operation, the system automatically applies a brake. When the intelligent brake assist is activated, a time to collision with the vehicle in front can be estimated.

Another alternative device is a device that predicts a collision of the vehicle when it is determined that an obstacle is approaching the vehicle by a driving-environment monitor that monitors a driving environment of the vehicle. The driving-environment monitor may be, for example, a laser radar or a camera. When the driving-environment monitor is used, a time to collision with the obstacle can also be estimated.

In S112, after a collision is predicted in S111, it is determined whether or not the time to collision can be estimated. If the time to collision can be estimated, the process proceeds to S113. If the response to the query of S112 is No, that is, the time to collision cannot be estimated, the process proceeds to S114. In the case in which only the anti-skid braking system is provided as the collision predictor, the result of the query is No in S112.

In the braking-force-distribution control process according to the first embodiment, when a collision of the vehicle is predicted, a method for changing the braking-force distribution between the regenerative brake and the frictional brake is determined.

A change rate of the braking-force distribution is determined based on the time to collision in S113 after it is decided that the time to collision can be estimated in S112.

More specifically, if, for example, the braking-force distribution between the regenerative brake and the frictional brake is changed in response to an activation of the intelligent brake assist that can estimate the time to collision, the change rate of the braking-force distribution is determined based on the estimated time to collision.

In addition, if the braking-force distribution between the regenerative brake and the frictional brake is changed in response a detection of an obstacle approaching the vehicle by the driving-environment monitor that can estimate the time to collision, the change rate of the braking-force distribution is determined based on the estimated time to collision with the obstacle.

The change rate of the braking-force distribution is determined from a limitation based on the vehicle's motion in S114, after it is decided that the time to collision cannot be estimated in S112.

More specifically, when the braking-force distribution between the regenerative brake and the frictional brake is changed in response to an activation of the anti-skid braking system, the braking-force distribution between the regenerative brake and the frictional brake is changed at such a rate that the vehicle's motion does not suddenly change.

After the change rate of the braking-force distribution is determined in S113 or S114, processing advances to S115. In S115 the braking-force distribution is changed at the determined change rate such that the braking force of the regenerative brake is reduced and that of the frictional brake is increased. Then the process ends.

In the operation of changing the braking-force distribution performed in S107, S108 or S115, the braking force of the regenerative brake applied by the motor-generator MG is reduced by limiting a proportion of the braking force of the regenerative brake applied by the motor-generator MG in a total braking force. The remaining proportion is allocated to the friction brake(s), so that the braking force of the frictional brake(s) is increased.

The proportion of the braking force of the regenerative brake applied by the motor-generator MG in the total braking force is changed by one of the following methods.

First is a method of reducing the proportion of the braking force of the regenerative brake applied by the motor-generator MG in the total braking force stepwise.

Another possible method is a method of reducing the proportion of the braking force of the regenerative brake applied by the motor-generator MG in the total braking force in a ramp manner.

In the braking-force-distribution control process according to the first embodiment, the distribution between the regenerative brake and the frictional brake is changed under the following control laws:

a. The change rate of the braking-force distribution is limited by response speeds of the regenerative brake applied by the motor-generator MG and the friction brake.

b. The change rate of the braking-force distribution is limited such that the operation of changing the braking-force distribution is finished within a desired time.

c. The braking-force distribution between the regenerative brake applied by the motor-generator MG and the frictional brake is changed to a distribution such that no malfunction occurs even if the high-voltage relay of the motor-generator MG is shut off.

d. The second clutch CL2 is disengaged after the proportion of the braking force of the regenerative brake applied by the motor-generator MG in the total braking force becomes equal to or less than a threshold.

e. When the second clutch CL2 is reengaged, the reengagement is started from the state in which the clutch input shaft and the clutch output shaft are not directly connected to each other (for example, an unlock-up state of a torque converter, a slip state of frictional elements of a clutch/brake unit).

f. When the vehicle collides, the high-voltage circuit $3b$ is controlled in accordance with the state of the vehicle.

g. When the vehicle speed is not zero after the collision, the high-voltage circuit $3b$ is shut off after the operation of changing the distribution between the regenerative brake applied by the motor-generator MG and the frictional brake is finished.

h. After the high-voltage circuit $3b$ is shut off, the DC/DC converter $3c$ is continuously operated until the voltage of the inverter $3a$ of the motor-generator MG is reduced.

i. After the high-voltage circuit $3b$ is shut off, power running of the motor-generator MG is performed if the second clutch CL2 is disengaged.

j. Even if the second clutch CL2 is not disengaged after the high-voltage circuit $3b$ is shut off, if it is possible to increase the braking force of the friction brake, power running of the motor-generator MG is performed, and the braking force of the frictional brake is increased by an amount corresponding to the power-running torque.

The operation of the braking-force-distribution control apparatus according to an embodiment is now described.

Generally, a hybrid vehicle, an electric vehicle (EV), a fuel-cell vehicle (FCV), etc., includes at least one electric storage device and at least one motor-generator for driving and braking. When the vehicle decelerates or stops in response to a brake operation, regenerative cooperative brake control is performed in which a braking force of a frictional brake is reduced or eliminated, while a braking force of a regenerative brake applied by the motor-generator is increased by an amount corresponding to the reduction in the braking force of the friction brake. In this type of vehicle, to prevent short circuits in the event of a collision or rollover, a circuit through which a high-voltage current flows (high-voltage circuit) is shut off by a relay circuit. On the other hand, when the brake is operated, and the regenerative cooperative brake control is performed, the proportion of the braking force of the regenerative brake in the required braking force is increased to a maximum and the remaining proportion is allocated to the frictional brake to reduce fuel consumption.

In the known structure, even when a collision of the vehicle occurs and the brake is suddenly operated, the regenerative cooperative brake control in which the proportion of the braking force of the regenerative brake in the required braking force is set to a maximum is performed. Accordingly, a large current is applied to the high-voltage circuit. In this case, when the high-voltage circuit to which a large current is being applied is shut off, the following problems occur.

First, when the high-voltage circuit is shut off, a braking distance is increased since regenerative braking control cannot be performed by the motor generator.

Second, if the high-voltage circuit is shut off while the motor-generator is being operated, a torque generated by the motor-generator is suddenly changed, which causes a change in the braking force.

Third, if the high-voltage circuit is shut off with a relay while the current is flowing, the relay will break due to seizing. In addition, there is a risk that the high-voltage circuit cannot be shut off due to seizing of the relay.

In comparison, the braking-force-distribution control apparatus and method taught herein can prevent the increase in the braking distance and the sudden change in the torque generated by the motor-generator and can shut off the high-voltage circuit using a relay that does not break due to seizing when the vehicle collides.

The above-described problems occur if the high-voltage circuit is shut off while the normal brake regenerative cooperative brake control is performed even though a collision is predicted or detected. In light of this fact, the braking-force-distribution control apparatus performs the braking-force-distribution control process in which the braking force of the regenerative brake applied by the motor-generator MG is reduced and braking force of the frictional brake is increased when the vehicle collides.

Accordingly, even when the vehicle collides and the high-voltage circuit $3b$ is shut off, an amount of reduction in the total braking force is equal to the amount corresponding to the reduced regenerative braking force. Therefore, the influence on the braking-force control can be reduced, and the braking distance can be prevented from being increased.

In addition, even when the vehicle collides and the high-voltage circuit $3b$ is shut off, a change in the braking torque generated by the motor-generator MG from the reduced braking torque to zero is small, or is zero if the braking force of the regenerative brake is already reduced to zero. Thus, a sudden change in the braking torque generated by the motor-generator MG is prevented, and the braking force is prevented from changing accordingly.

In addition, since the braking force of the regenerative brake is reduced and that of the frictional brake is increased when the vehicle collides, a current that flows through the high-voltage circuit $3b$ can be reduced by the amount corresponding to the reduction in the braking force of the regenerative brake. Therefore, even when the vehicle collides and the high-voltage circuit $3b$ is shut off, the relay is prevented from breaking due to seizing. Accordingly, the risk that the high-voltage circuit $3b$ cannot be shut off due to seizing of the relay can be eliminated.

As a result, when the vehicle collides an increase in the braking distance and a sudden change in the torque generated by the motor-generator can be prevented. Also, the high-voltage circuit can be shut off by a relay that does not break due to seizing.

A braking-force-distribution control operation performed when only the collision detection can be performed, a braking-force-distribution control operation performed when both the collision detection and prediction can be performed, and effects of the braking-force-distribution control operation according to the first embodiment are described below.

A braking-force-distribution control operation performed when only the collision detection can be performed is first described. Referring to the flowchart shown in FIG. 9, when a collision is detected and the collision impact value is higher than the power shut-off threshold, the process proceeds to S101, S102, S103 (or S104), S105, S107 and S110, in that order, and then ends. More specifically, if the collision impact value is higher than the power shut-off threshold set in S103 or S104, the process proceeds to S107, where the braking-force distribution is immediately changed such that the braking force of the regenerative brake is reduced and that of the frictional brake is increased without taking a change-rate limit into account. Then, in S110, the high-voltage relay of the high-voltage circuit 3b is shut off.

When the collision impact value is equal to or lower than the power shut-off threshold, and the vehicle speed is not zero, the process proceeds to S101, S102, S103 (or S104), S105, S106, S108 and S109, in that order, and then ends. These steps are repeated until it is determined that the operation of changing the braking-force distribution is finished in S109. Then, the process proceeds to S110 from S109, and then ends. More specifically, if the collision impact value is equal to or lower than the power shut-off threshold set in S103 or S104, and it is determined that the vehicle speed is not zero in S106, the process proceeds to S108, where the braking-force distribution is changed such that braking force of the regenerative brake is reduced and that of the frictional brake is increased at a rate within the change-rate limit. Then, if it is determined that the operation of changing the braking-force distribution is finished in S109, the process proceeds to S110, where the high-voltage relay of the high-voltage circuit 3b is shut off.

When the collision impact value is equal to or lower than the power shut-off threshold, and the vehicle speed is zero, the process proceeds to S101, S102, S103 (or S104), S105, S106, S107 and S110, in that order, and then ends. More specifically, if the collision impact value is equal to or lower than the power shut-off threshold set in S103 or S104, and the vehicle speed is zero, the process proceeds to S107, where the braking-force distribution is immediately changed such that the braking force of the regenerative brake is reduced and that of the frictional brake is increased without taking a change-rate limit into account. Then, in S110, the high-voltage relay of the high-voltage circuit 3b is shut off.

Next, a braking-force-distribution control operation performed when both the collision detection and prediction can be performed is described. Referring to the flowchart shown in FIG. 9, when a collision is predicted the process proceeds to S101, S111, S112, S113 (or S114) and S115, in that order, and then ends. More specifically, if a time to collision can be estimated in S112, the process proceeds to S113, where the change rate of the braking-force distribution is determined based on the time to collision. Then, the process proceeds to S115, where the braking-force distribution is changed at the determined change rate. If the time to collision is not predictable in S112, the process proceeds to S114, where the change rate of the braking-force distribution is determined from a limitation based on the vehicle's motion. Then, the process proceeds to S115, where the braking-force distribution is changed at the determined change rate.

When a collision is detected, S101 to S110 are executed as described above.

There is a possibility that the time to collision cannot be estimated and the operation of changing the braking-force distribution cannot be finished before a collision is detected. In such a case, when a collision is detected, the process waits until it is determined that the operation of changing the braking-force distribution is finished in S109, and then proceeds to S110. In S110, the high-voltage relay of the high-voltage circuit 3b is shut off. Alternatively, if the vehicle speed is determined to be zero in S106, the process proceeds to S107 and then to S110, where the high-voltage relay of the high-voltage circuit 3b is shut off.

If the time to collision can be estimated, and the operation of changing the braking-force distribution is finished by the time the collision is detected, the process proceeds to S101, S102, S103 (or S104), S105, S106, S108, S109 and S110, in that order, in the flowchart shown in FIG. 9. Therefore, even if the vehicle speed is more than zero, the high-voltage relay of the high-voltage circuit 3b is immediately shut off.

Figure 10:
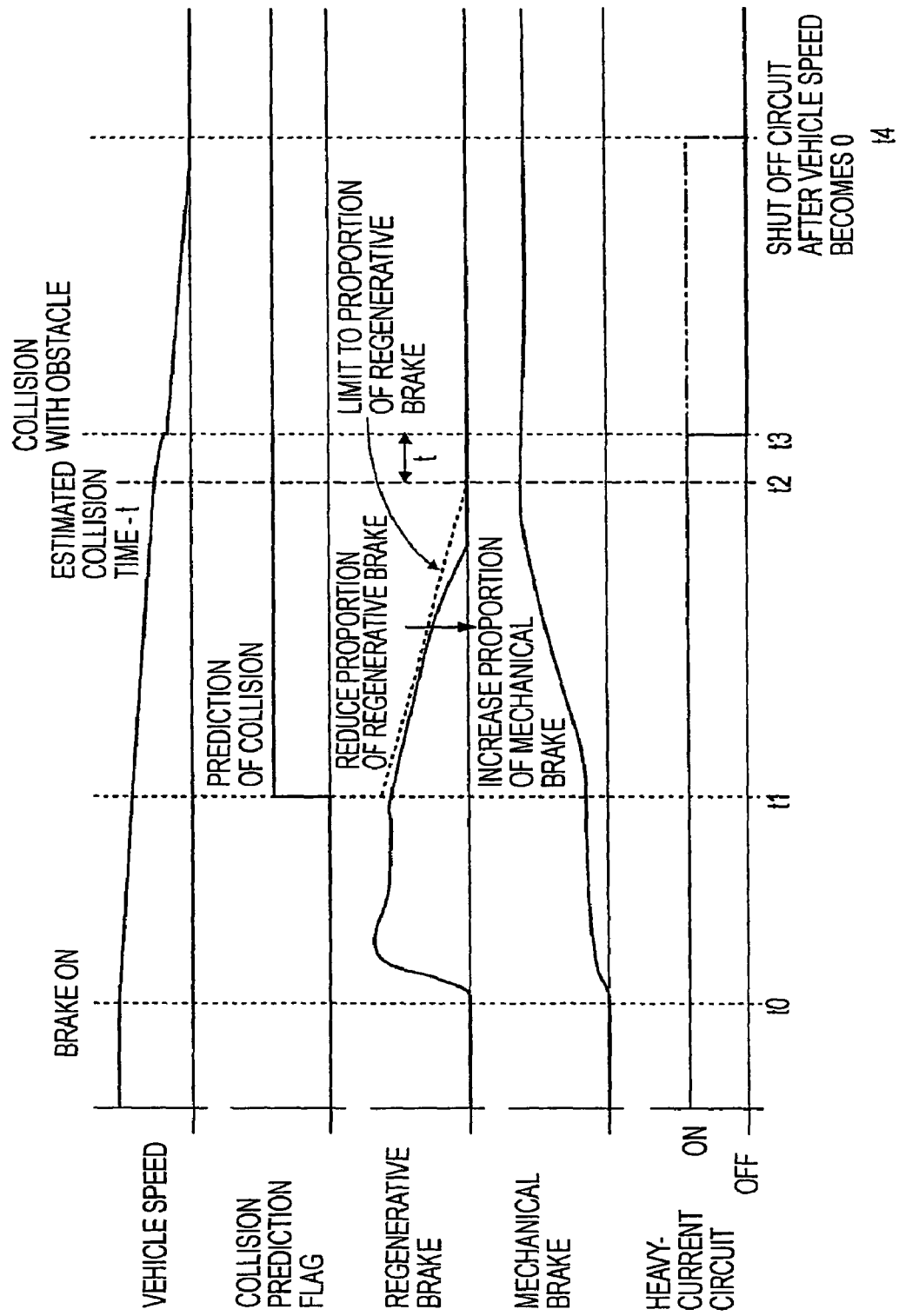
FIG. 10 is a time chart showing the characteristics of a vehicle speed, a collision prediction flag, a regenerative brake, a mechanical brake and a high-voltage circuit obtained by the hybrid vehicle including the braking-force-distribution control apparatus according to the first embodiment when the time to collision can be estimated and an operation of changing the braking-force distribution is finished before collision.

FIG. 10 is a time chart showing the characteristics of the vehicle speed, the collision prediction flag, the regenerative brake, the mechanical brake and the high-voltage circuit. The time chart of FIG. 10 illustrates an example of a collision pattern obtained by a hybrid vehicle including a braking-force-distribution control apparatus as taught herein when the time to collision can be estimated and the operation of changing the braking-force distribution is finished before collision. Effects of the braking-force-distribution control operation are described below with reference to the time chart shown in FIG. 10.

When the driver operates the brake at time t0, the regenerative braking force is increased with quick response, and the mechanical brake (i.e., the friction brake(s)) is gradually increased after a short period from time t0.

Then, when the collision is predicted at time t1, since the time to collision can be estimated, the rate of reduction in the braking force of the regenerative brake and the rate of increase in the braking force of the mechanical brake are determined such that the operation of changing the braking-force distribution can be finished before time t2. Time t2 is obtained by subtracting a set time t from the estimated time to collision. Accordingly, in the time period between time t1 at which the collision is predicted and time t2, the braking force of the regenerative brake is gradually reduced at the determined rate of reduction and the braking force of the mechanical brake is increased by an amount corresponding to the amount of reduction in the braking force of the regenerative brake.

Then, when a collision with an obstacle is detected at time t3, since the operation of changing the braking-force distribution is finished by time t2, the state of the high-voltage circuit 3b is immediately changed from ON to OFF.

If the operation of changing the braking-force distribution is not finished by the time the collision is detected, the high-voltage relay of the high-voltage circuit 3b is shut off at time t4 at which time the vehicle speed is reduced to zero.

Advantages provided by the braking-force-distribution control apparatus included in the hybrid vehicle according to the first embodiment are next described.

First, a braking-force-distribution control apparatus and method for controlling a braking-force distribution in a vehicle collision are used in a vehicle including at least one electric storage device and at least one motor-generator MG for driving and braking. When the vehicle decelerates or stops in response to a brake operation, regenerative cooperative brake control is performed in which a braking force of a frictional brake is reduced or eliminated while a braking force of a regenerative brake applied by the motor-generator MG is increased by an amount corresponding to the reduction in the braking force of the friction brake. When the vehicle collides, the braking-force-distribution control apparatus reduces the braking force of the regenerative brake applied by the motor-generator MG and increases the braking force of the friction brake. Therefore, when the vehicle collides, an increase in the braking distance and a sudden change in the torque generated by the motor-generator MG can be prevented. Also, the high-voltage circuit 3b can be shut off with a relay that does not break due to seizing.

Second, the braking-force-distribution control apparatus and method start to control the braking-force distribution between the regenerative brake and the frictional brake when the collision detector detects a collision of the vehicle (see, e.g., S101). Therefore, when a vehicle collision is detected, an increase in the braking distance and a sudden change in the torque generated by the motor-generator MG can be prevented, and the high-voltage circuit 3b can be shut off with a relay that does not break due to seizing.

Third, the collision detector detects a collision of the vehicle (see, e.g., S101) with an airbag sensor, for example, and accordingly the operation of controlling the braking-force distribution between the regenerative brake and the frictional brake is started. Since the airbag sensor that is initially mounted in the vehicle is used, in addition to the advantages mentioned as the second point above, the collision detector can be provided without increasing the cost.

Fourth, the collision detector detects a collision of the vehicle (see, e.g., S101) with an acceleration sensor included in a vehicle motion control system or a traction control system, for example, and accordingly the operation of controlling the braking-force distribution between the regenerative brake and the frictional brake is started. Since the acceleration sensor that is initially mounted in the vehicle is used, in addition to the advantages mentioned as to the second point above, the collision detector can be provided without increasing the cost.

Fifth, the collision detector detects a collision of the vehicle (see, e.g., S101) with a crash sensor, for example, and accordingly the operation of controlling the braking-force distribution between the regenerative brake and the frictional brake is started. Therefore, in addition to the advantages mentioned in the second point above, conditions under which the braking-force distribution is changed can be set in accordance with the sensitivity and orientation of the crash sensor.

Sixth, the braking-force-distribution control apparatus and method determine the braking-force distribution between the regenerative brake and the frictional brake based on the level of impact when a collision of the vehicle is detected. If the level of impact of the collision is high, and the vehicle is severely damaged, the braking-force distribution is quickly changed. The high-voltage circuit 3b is quickly shut off to prevent vehicle fire and electrification. If the level of impact of the collision is low, and the vehicle is not severely damaged, the braking-force distribution is changed at such a rate that the vehicle's motion does not suddenly change. Accordingly, a shock in the driving/braking force does not occur and the vehicle's motion can be prevented from becoming unstable.

Seventh, the braking-force-distribution control apparatus and method immediately change the braking-force distribution between the regenerative brake and the frictional brake (see, e.g., S107) if the collision impact value is higher than the power shut-off threshold. Accordingly, the state in which the high-voltage circuit 3b can be shut off is quickly established. In addition, even when the high-voltage circuit 3b is shut off immediately after the collision, the vehicle can be stopped by the friction brake(s).

Eighth, the braking-force-distribution control apparatus and method change the braking-force distribution between the regenerative brake and the frictional brake at such a rate that the vehicle's motion does not suddenly change (see e.g., S108) if the collision impact value is equal to or lower than the power shut-off threshold. Therefore, a shock in the driving/braking force due to a sudden change in the motor torque does not occur, and the vehicle's motion can be prevented from becoming unstable.

Ninth, even if the collision impact value is equal to or lower than the power shut-off threshold, if the vehicle is stopped, the braking-force-distribution control apparatus and method immediately change the braking-force distribution between the regenerative brake and the frictional brake (S106→S107). When the vehicle is stopped, the vehicle's motion does not become unstable even if the braking-force distribution is suddenly changed. Therefore, in such a case, the state in which the high-voltage circuit 3b can be shut off is quickly established by immediately changing the braking-force distribution. In addition, when the vehicle is stopped after the collision, there is a possibility that someone will touch high-voltage components for inspection or maintenance of the vehicle. Therefore, the state in which the high-voltage circuit 3b can be shut off is quickly established, so that the high-voltage circuit 3b can be quickly shut off to prevent electrification. Therefore, the advantages mentioned in the seventh and eighth items above can be obtained.

Tenth, the braking-force-distribution control apparatus and method set the power shut-off threshold for the collision impact value to different values depending on a collision direction (see, e.g., S103). Therefore, the advantages mentioned in the seventh through ninth items above can be optimally and safely obtained.

Eleventh, the braking-force-distribution control apparatus and method set the power shut-off threshold for the collision impact value to a small value when the collision direction is a direction in which a high-voltage element, an electric storage element or an element using fuel is disposed (see, e.g., S103). Accordingly, the braking-force distribution is suddenly changed when an impact is applied in the direction in which the high-voltage element, the electric storage element or the element using fuel is disposed. In other cases, the brake performance is prioritized in the operation of controlling the braking-force distribution. Therefore, the advantages mentioned in the seventh through ninth items above can be optimally and safely obtained.

Twelfth, the braking-force-distribution control apparatus and method start the operation of controlling the braking-force distribution between the regenerative brake and the frictional brake when a collision of the vehicle is predicted by the collision predictor (see, e.g., S111). Therefore, when a collision is predicted, the braking-force distribution can be controlled before the vehicle actually collides so that an increase in the braking distance and a sudden change in the torque generated by the motor-generator MG can be prevented. Also, the high-voltage circuit 3b can be shut off with a relay that does not break due to seizing.

Thirteenth, the collision predictor predicts a collision of the vehicle (see, e.g., S111) when an intelligent brake assist is activated. Accordingly, the operation of controlling the braking-force distribution between the regenerative brake and the frictional brake is started. Since the information from the intelligent brake assist system that is initially mounted in the vehicle is used, in addition to the advantages mentioned in the twelfth item above, the collision predictor can be provided without increasing the cost.

Fourteenth, the collision predictor predicts a collision of the vehicle (see, e.g., S111) when an anti-skid braking system is activated. Accordingly, the operation of controlling the braking-force distribution between the regenerative brake and the frictional brake is started. Since the information from the anti-skid braking system that is initially mounted in the vehicle is used, in addition to the advantages mentioned in the twelfth item above, the collision predictor can be provided without increasing the cost.

Fifteenth, the collision predictor predicts a collision of the vehicle (see, e.g., S111) when a driving-environment monitor that monitors a driving environment of the vehicle determines that an obstacle is approaching the vehicle. Accordingly, the operation of controlling the braking-force distribution between the regenerative brake and the frictional brake is started. Therefore, in addition to the advantages described in the twelfth item above, conditions under which the braking-force distribution is changed can be set in accordance with the sensor and method of detecting the possibility of collision.

Sixteenth, when a collision of the vehicle is predicted, the braking-force-distribution control apparatus and method determine the braking-force distribution between the regenerative brake and the frictional brake based on an estimated state of collision. When the estimated time to collision is long, the vehicle's motion is prioritized, and the braking-force distribution is relatively slowly changed. Accordingly, the braking-force distribution can be safely changed. When the estimated time to collision is short, the braking-force distribution is changed such that the operation of changing the braking-force distribution can be finished before the collision. Accordingly, the operation of changing the braking-force distribution can be finished before the collision.

Seventeenth, when the braking-force-distribution control apparatus and method start to change the braking-force distribution between the regenerative brake and the frictional brake in response to an activation of the intelligent brake assist, the change rate of the braking-force distribution is determined on the basis of the estimated time to collision (S112→113). Since the time to collision with the vehicle in front can be estimated, the operation of changing the braking-force distribution can be finished by the time the vehicle collides with the vehicle in front.

Eighteenth, when the braking-force-distribution control apparatus and method start to change the braking-force distribution between the regenerative brake and the frictional brake in response to an activation of the anti-skid braking system, the braking-force distribution between the regenerative brake and the frictional brake is changed at a rate within such a range that the vehicle's motion does not suddenly change (S112→S114). Therefore, although the time to collision cannot be estimated, the operation of changing the braking-force distribution can be started without suddenly changing the vehicle's motion.

Nineteenth, when the braking-force-distribution control apparatus and method start to change the braking-force distribution between the regenerative brake and the frictional brake in response to a detection of an obstacle approaching the vehicle by the driving-environment monitor, the change rate of the braking-force distribution between the regenerative brake and the frictional brake is determined based on the estimated time to collision with the obstacle (S112→S113). Since the time to collision with the obstacle can be estimated, the operation of changing the braking-force distribution can be finished by the time the vehicle collides with the obstacle.

Twentieth, the braking-force-distribution control apparatus and method change the braking-force distribution by limiting a proportion of the braking force of the regenerative brake applied by the motor-generator MG in a total braking force and that of the braking force of the friction brake. Therefore, the change rate of the braking-force distribution between the regenerative brake and the frictional brake can be controlled by adjusting the manner in which the proportions of the braking forces of regenerative brake and the frictional brake in the total braking force are changed.

Twenty-first, the braking-force-distribution control apparatus and method change the braking-force distribution by limiting a proportion of the braking force of the regenerative brake applied by the motor-generator MG in a total braking force and allocating the remaining proportion to the friction brake. Accordingly, the change rate of the braking-force distribution between the regenerative brake and the frictional brake can be controlled based on the manner in which the proportion of the braking force of the regenerative brake in the total braking force is limited.

Twenty-second, the braking-force-distribution control apparatus and method change the braking-force distribution by reducing the proportion of the braking force of the regenerative brake applied by the motor-generator MG in the total braking force stepwise. Accordingly, the braking-force distribution can be prevented from being suddenly changed.

Twenty-third, the braking-force-distribution control apparatus and method change the braking-force distribution by reducing the proportion of the braking force of the regenerative brake applied by the motor-generator MG in the total braking force in a ramp manner. Accordingly, the braking-force distribution can be prevented from being suddenly changed.

Twenty-fourth, the braking-force-distribution control apparatus and method limit the change rate of the braking-force distribution based on response speeds of the regenerative brake applied by the motor-generator MG and the friction brake. Therefore, when the braking-force distribution between the regenerative brake and the frictional brake is changed, the total braking force can be prevented from being varied due to response delay.

Twenty-fifth, the braking-force-distribution control apparatus and method limit the change rate of the braking-force distribution such that the operation of changing the braking-force distribution is finished within a desired time. Accordingly, the braking-force distribution between the regenerative brake and the frictional brake can be finished within the desired time. In addition, the braking-force distribution can be prevented from being changed at an unnecessarily high change rate, and accordingly the vehicle's motion can be prevented from being suddenly changed.

Twenty-sixth, the braking-force-distribution control apparatus and method change the braking-force distribution between the regenerative brake applied by the motor-generator MG and the frictional brake to a distribution such that no malfunction occurs even if the high-voltage relay of the motor-generator MG is shut off. Therefore, malfunction can be prevented when the high-voltage relay is shut off after the braking-force distribution between the regenerative brake and the frictional brake is changed.

Twenty-seventh, the above-described vehicle is a hybrid vehicle that has a hybrid driving system including the first clutch CL1 interposed between the engine E and the motor-generator MG and the second clutch CL2 interposed between the motor-generator MG and the driving wheels RR and RL. When the proportion of the braking force of the regenerative brake applied by the motor-generator MG in the total braking force becomes equal to or less than a threshold, the braking-force-distribution control apparatus and method disengage the second clutch CL2. Accordingly, even when the high-voltage relay is shut off, the vehicle's motion is prevented from being influenced by a sudden change in the motor torque, and a torque change that occurs when the second clutch CL2 is disengaged can be reduced.

Twenty-eighth, when the second clutch CL2 is reengaged, the braking-force-distribution control apparatus and method start the reengagement of the second clutch CL2 from the state in which the clutch input shaft and the clutch output shaft are not directly connected to each other. Therefore, the shock in the driving force can be reduced at the time of reengagement.

Twenty-ninth, when the vehicle collides, the braking-force-distribution control apparatus and method control the high-voltage circuit 3b in accordance with the state of the vehicle. Therefore, the high-voltage circuit 3b can be reliably shut off when there is a possibility of short circuit. When there is no possibility of short circuit, the high-voltage circuit is not shut off, and the operation of the vehicle system is prioritized.

Thirtieth, if the vehicle speed is more than zero after the collision of the vehicle, the braking-force-distribution control apparatus and method shut off the high-voltage circuit 3b after the operation of changing the braking-force distribution between the regenerative brake applied by the motor-generator MG and the frictional brake is finished. Therefore, the vehicle's motion is prevented from being suddenly changed when the high-voltage circuit 3b is shut off.

Thirty-first, after the high-voltage circuit 3b is shut off, the braking-force-distribution control apparatus and method continuously operate the DC/DC converter 3c until the voltage of the inverter 3a of the motor-generator MG is reduced. Therefore, safety can be ensured after the high-voltage circuit 3b is shut off.

Thirty-second, after the high-voltage circuit 3b is shut off, the braking-force-distribution control apparatus and method allow power running of the motor-generator MG if the second clutch CL2 is disengaged. Therefore, the remaining voltage of the motor-generator MG and the inverter 3a can be consumed. In addition, since power running of the motor-generator MG is performed after the second clutch CL2 is disengaged, the generated torque is prevented from affecting the driving force.

Thirty-third, even if the second clutch CL2 is not disengaged after the high-voltage circuit 3b is shut off, if it is possible to increase the braking force of the friction brake the braking-force-distribution control apparatus and method allow power running of the motor-generator MG and increase the braking force of the frictional brake by the amount corresponding to the power-running torque. Therefore, the remaining voltage of the motor-generator MG and the inverter 3a can be consumed, and the power running torque generated by the motor-generator MG can be canceled by the friction brake.

Although the braking-force-distribution control apparatus and method for controlling the braking-force distribution in a vehicle collision according to embodiments have been described above, the invention is not limited to these embodiments. Various modifications and design changes are possible.

Figure 11:
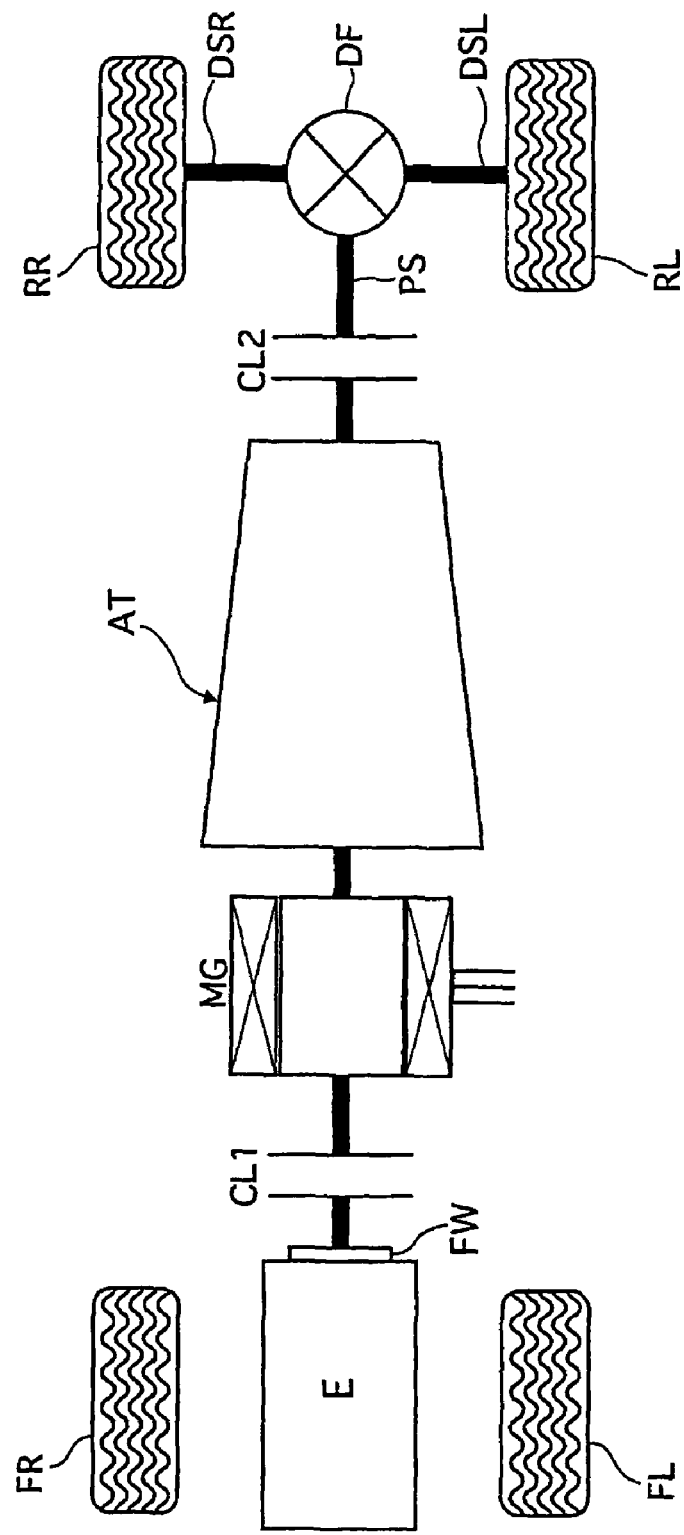
FIG. 11 is a schematic diagram illustrating a drive system of another example of a rear-wheel-drive hybrid vehicle to which embodiments of the braking-force-distribution control apparatus can be applied.

For example, although the invention is applied to a rear-wheel-drive hybrid vehicle according to the described embodiments, the invention may also be applied to front-wheel-drive hybrid vehicles and four-wheel-drive hybrid vehicles. In addition, although a clutch mounted in the automatic transmission is explained as the second clutch, a clutch that is additionally provided between a motor-generator and a transmission may be used as the second clutch. Alternatively, as shown in FIG. 11, a second clutch CL2 may also be additionally provided between the transmission AT and driving wheels RR, RL.

In addition, a belt-type or toroidal-type non-stage transmission may also be used in place of the automatic transmission AT.

Although the braking-force-distribution control apparatus and method are applied to a hybrid vehicle herein, the invention may also be applied to an electric vehicle or a fuel-cell vehicle. The invention may be applied to any type of vehicle that includes at least one electric storage device and at least one motor-generator for driving and braking and that performs regenerative cooperative brake control when the vehicle decelerates or stops in response to a brake operation. In the regenerative cooperative brake control, the braking force of the frictional brake is reduced or eliminated while the braking force of the regenerative brake applied by the motor-generator is increased by an amount corresponding to the reduction in the braking force of the frictional brake in the regenerative cooperative brake control.

Also, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A brake force control apparatus for a vehicle, comprising:
    a battery;
    a motor-generator that performs regenerative braking with a regenerative braking force and charges the battery with electric power regenerated;
    a frictional braking device that performs frictional braking with a frictional braking force;
    a collision detecting device operable to detect a collision against an obstacle wherein the collision detecting device is a collision detector that detects the collision by a magnitude of impact exerted on the vehicle; and
    a controller configured to:
        set a braking force distribution such that a sum of the regenerative braking force and the frictional braking force becomes equal to a required braking force according to an operator braking action; and
        start changing the braking force distribution by reducing the regenerative braking force and increasing the frictional braking force when the collision detector detects the collision; and
        control a changing speed for changing the braking force distribution based on the magnitude of impact when the collision detector detects the collision.

2. The brake force control apparatus according to claim 1 wherein the collision detector is an airbag sensor that senses an acceleration of the vehicle for activating an airbag.

3. The brake force control apparatus according to claim 1 wherein the collision detector is an impact sensor disposed on the vehicle.

4. The brake force control apparatus according to claim 1 wherein the collision detector is an acceleration sensor of a vehicle dynamics control system or a traction control system.

5. The brake force control apparatus according to claim 1 wherein the controller is configured to:
    change the braking force distribution immediately when the magnitude of impact is higher than a power shut-off threshold value and to change the braking force distribution at a speed under which a sudden change of vehicle dynamic behavior is avoidable when the magnitude of impact is equal to or lower than the power shut-off threshold value; and
    set the power shut-off threshold value to a value wherein when the magnitude of impact is higher than the value, power supply between the motor-generator and the battery should be shut-off.

6. The brake force control apparatus according to claim 5 wherein the controller is further configured to:
    determine whether the vehicle comes to a standstill when the collision detector detects the collision; and
    change the braking force distribution immediately if the vehicle is at a standstill even when the magnitude of impact is equal to or lower than the power shut-off threshold value.

7. The brake force control apparatus according to claim 5 wherein the power shut-off threshold value is set according to a direction of the collision.

8. The brake force control apparatus according to claim 7 wherein the power shut-off threshold value is set lower if the collision is from directions where at least one of a high-voltage element, a high-voltage battery and a fuel supply element is disposed.

9. The brake force control apparatus according to claim 1 wherein the controller is configured to:
   restrict the braking force distribution to the regenerative braking force performed by the motor-generator; and
   distribute a braking force equivalent to a difference between the required braking force and the regenerative braking force to the frictional braking force.

10. The brake force control apparatus according to claim 9 wherein the controller is configured to reduce the regenerative braking force by strengthening a degree of restriction on the braking force distribution to the regenerative braking force in a phased manner.

11. The brake force control apparatus according to claim 9 wherein the controller is configured to reduce the regenerative braking force by strengthening a degree of restriction on the braking force distribution to the regenerative braking force in a ramp manner.

12. The brake force control apparatus according to claim 9 wherein the controller is further configured to restrict a speed of changing the braking force distribution by a response speed of the regenerative braking force performed by the motor-generator and a response speed of the frictional braking force performed by the frictional braking device.

13. The brake force control apparatus according to claim 12 wherein the controller is further configured to restrict a speed of changing the braking force distribution such that the change of the braking force distribution can be completed in a required time.

14. A brake force control apparatus for a vehicle, comprising:
   a battery;
   a motor-generator that performs regenerative braking with a regenerative braking force and charges the battery with electric power regenerated;
   a frictional braking device that performs frictional braking with a frictional braking force;
   a collision detecting/predicting device operable to detect or predict a collision against an obstacle;
   a high-voltage relay disposed between the motor-generator and the battery; and
   a controller configured to:
      set a braking force distribution such that a sum of the regenerative braking force and the frictional braking force becomes equal to a required braking force according to an operator braking action;
      change the braking force distribution by reducing the regenerative braking force and increasing the frictional braking force when the collision detecting/predicting device detects or predicts the collision; and
      set the braking force distribution to the regenerative braking force performed by the motor-generator smaller than a threshold brake force amount; and
   wherein the threshold brake force amount is an amount corresponding to a regeneration electric current that will not cause failure when a power supply between the motor-generator and the battery is shut-off by turning off the high-voltage relay.

15. The brake force control apparatus according to claim 14 wherein the vehicle is a hybrid vehicle, the hybrid vehicle further comprising:
   an engine;
   a first clutch disposed between the engine and the motor-generator;
   a second clutch disposed between the motor-generator and at least one drive wheel; and wherein:
   the controller is further configured to disengage the second clutch when the braking force distribution to the regenerative braking force becomes equal to or smaller than the threshold brake force amount.

16. The brake force control apparatus according to claim 15 wherein the controller is further configured to reengage the second clutch in a slip-engaging manner when reengaging the second clutch after disengagement.

17. The brake force control apparatus according to claim 14 wherein:
   the collision detecting/predicting device is a collision predictor that predicts the collision; and
   the controller is further configured to start changing the braking force distribution when the collision predictor predicts the collision.

18. The brake force control apparatus according to claim 17 wherein the controller is configured to:
   restrict the braking force distribution to the regenerative braking force performed by the motor-generator;
   distribute a braking force equivalent to a difference between the required braking force and the regenerative braking force to the frictional braking force; and
   restrict a speed of changing the braking force distribution by a response speed of the regenerative braking force performed by the motor-generator and a response speed of the frictional braking force performed by the frictional braking device such that the change of the braking force distribution can be completed in a required time.

19. The brake force control apparatus according to claim 17 wherein the collision predictor is operable to predict the collision when an intelligent brake assist system operates.

20. The brake force control apparatus according to claim 17 wherein the collision predictor is operable to predict the collision when an anti-skid brake system operates.

21. The brake force control apparatus according to claim 17 wherein:
   the collision predictor comprises a driving-environment monitor configured to monitor a driving-environment around the vehicle; and
   the collision predictor predicts the collision when the driving-environment monitor detects an approaching of the obstacle.

22. The brake force control apparatus according to claim 17 wherein the controller is further configured to:
   control a speed of changing the braking force distribution based on a predicted situation of collision when the collision predictor predicts the collision.

23. The brake force control apparatus according to claim 22 wherein:
   the collision predictor predicts the collision when an intelligent brake assist system operates; and
   the controller is configured to determine the speed of changing the braking force distribution based on a marginal time required for the vehicle to collide with the obstacle predicted by the intelligent brake assist system.

24. The brake force control apparatus according to claim 22 wherein:

the collision predictor predicts the collision when an antiskid brake system operates; and the controller is configured to change the braking force distribution at a speed ratio under which a sudden change of vehicle dynamic behavior is avoidable.

25. The brake force control apparatus according to claim 22 wherein:

the collision predictor comprises a driving-environment monitor configured to monitor a driving-environment around the vehicle;

the collision predictor predicts the collision when the driving-environment monitor detects an approaching of the obstacle; and the controller is configured to determine the speed of changing the braking force distribution based on a marginal time required for the vehicle to collide with the obstacle predicted by the driving-environment monitor.

26. A brake force control apparatus for a vehicle, comprising:

a battery;

a motor-generator that performs regenerative braking with a regenerative braking force and charges the battery with electric power regenerated;

a frictional braking device that performs frictional braking with a frictional braking force;

a collision detecting/predicting device operable to detect or predict a collision against an obstacle; and a controller configured to:
set a braking force distribution such that a sum of the regenerative braking force and the frictional braking force becomes equal to a required braking force according to an operator braking action;
change the braking force distribution by reducing the regenerative braking force and increasing the frictional braking force when the collision detecting/predicting device detects or predicts the collision; and
control a power supply between the motor-generator and the battery based on a situation of the vehicle when the collision detecting/predicting device detects or predicts the collision.

27. The brake force control apparatus according to claim 26, further comprising:

a high-voltage relay disposed between the motor-generator and the battery; and wherein the controller is configured to:

determine whether the vehicle comes to a standstill when the collision detecting/predicting device detects or predicts the collision; and shut-off the power supply between the motor-generator and the battery by turning off the high-voltage relay after completing the change of the braking force distribution if the vehicle is not at a standstill.

28. The brake force control apparatus according to claim 27, further comprising:

an inverter disposed between the battery and the high-voltage relay; and a DC-DC converter disposed between the battery and a lower voltage battery; and wherein:

the controller is further configured to keep the DC-DC converter operating until a voltage of the inverter falls after shutting-off the power supply between the motor-generator and the battery.

29. The brake force control apparatus according to claim 27 wherein the vehicle is a hybrid vehicle, the hybrid vehicle further comprising:

an engine;

a first clutch disposed between the engine and the motor-generator; and a second clutch disposed between the motor-generator and at least one drive wheel; and wherein the controller is further configured to:

determine whether the second clutch is disengaged after shutting-off the power supply between the motor-generator and the battery; and operate the motor-generator in power-running mode if the second clutch is disengaged.

30. The brake force control apparatus according to claim 29 wherein the controller is further configured to:

determine whether the frictional braking device has a margin to increase the frictional braking force after shutting-off the power supply between the motor-generator and the battery;

operate the motor-generator in power-running mode if the frictional braking device has the margin to increase the frictional braking force even when the second clutch is not disengaged; and increase the frictional braking force by an amount corresponding to a power-running torque of the motor-generator.

* * * * *